May 14, 1935.  H. A. HUSTED  2,001,349

STEERING WHEEL AND IDENTIFICATION MEANS

Filed June 22, 1934   2 Sheets—Sheet 1

Inventor
Harry A. Husted,
By Justin W. Macklin,
Attorney

May 14, 1935. H. A. HUSTED 2,001,349
STEERING WHEEL AND IDENTIFICATION MEANS
Filed June 22, 1934 2 Sheets-Sheet 2

Inventor
Harry A. Husted,
By Justin W. Macklin,
Attorney

Patented May 14, 1935

2,001,349

UNITED STATES PATENT OFFICE 2,001,349

STEERING WHEEL AND IDENTIFICATION MEANS

Harry A. Husted, Lakewood, Ohio

Application June 22, 1934, Serial No. 731,933

7 Claims. (Cl. 40—2.2)

This invention relates to steering wheels and particularly to automobile steering wheels, and it also relates to a means which may be associated with the steering wheel and with other parts of an automobile for identification in such manner as to discourage theft more particularly and make it easy to identify the vehicle and very difficult or impossible to destroy or alter the identification means without leaving very obvious, easily discerned evidence of such alteration.

Further objects include the provision of such a marking identifying means, tending to prevent theft, as may be cheaply manufactured, easily and permanently applied and which shall result in a decorative display of the identification marks or serial numbers; more specifically provide a metallic strip to be applied to the steering wheel having embossed thereon an identification serial number or mark, and which may be welded or otherwise be permanently secured to the metallic frame of the wheel, and which shall present its characters even with the surface of a molded coating of the frame of the wheel, in such manner that the attempts at alteration will result in destroying this coating, or will leave mutilated characters, easily detected.

Further features of this means for identification are that they may be easily read at a glance through the closed windows of the automobile, as may be desirable when the automobile is closed and locked, and further whereby theft is likely to be avoided by reason of the fact that the thief is sure to be warned by a glance at the steering wheel by reason of a comparatively large, visible identification means, in this most conspicuous place. Obviously no thief could drive or tow away the car without discovering the identification thus displayed upon the steering wheel. It is well known by theft insurance people that cars having such an identification means are avoided by thieves, who are well aware that such cars are protected by registration, and that any automobile thief would know at a glance that my steering wheel identification would not be subject to alteration without it being apparent upon subsequent inspection.

It is accordingly further the object of the invention to so construct the steering wheel that it may not be capable of being removed or replaced without removing the entire steering column and its steering gear connections, which the thief knows cannot be done without requiring replacement before the car again has any utility and which would require contacting authorized distributing agents, and others who would inevitably have notice of such attempted change. It is well known that heretofore identification numerals have been placed upon the body of the car, frame, or the motor, but usually in positions difficult to locate and not convenient to inspect. Theft systems have been perfected to a point where even the entire motor so marked, may be "switched" or interchanged with another, to avoid detection, but inasmuch as my identification means is so easily inspected from the moment the thief takes it and is so difficult (I claim practically impossible) of interchanging, it will be seen that the automobile thief is at once deterred from his purpose, and that cars or makes known to have such identification will have certain immunity which very favorably affects theft insurance rates and thus may promote the sale of such makes of automobiles as make use of this invention.

A further object is to so construct the steering wheel that it may be strong, non-removable, artistic in appearance, and be capable of being cheaply manufactured.

A still further object is to make the spider, namely the arm spokes and hub, hollow so that wiring connections to points on the spokes or on the rim may be conveniently connected with the wiring of the car for lights, horn control or other purposes.

A further object is so to construct and shape the metallic steering wheel spider that it may be coated from hub to rim by molded plastic material of minimum thickness and whereby it may have no special corners, shoulders, large fillets or off-set joints now affording difficulties in the construction of the present steering wheels and requiring the use of large amount of material.

Further objects will become apparent in the following description which relates to the drawings and the essential characteristics of my invention are summarized in the claims.

Figure 1:
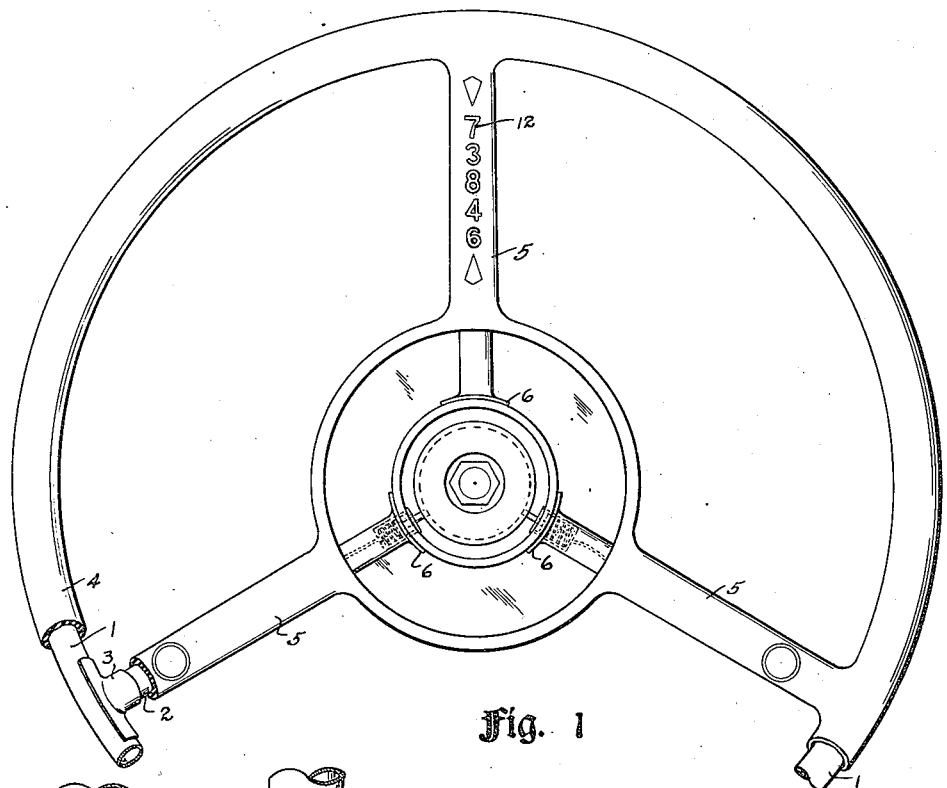
Fig. 1 is a partial sectional plan view of a steering wheel embodying my improvements.

Describing the structure shown in the drawings by the use of reference numerals, 1 designates the tubular rim portion, 2 the tubular spoke portions connected to the rim by short tubular sections 3, embracing the spoke members 2 and having enlarged and spread flanges embracing and fitting the inner side of the rim. The inner ends of the spokes 2, are spread as indicated at 6, and these portions are secured to a flange of a cup-shaped member 25 rigidly connected with the head 23 of the steering column 20, there being enlarged cylindrical portions 22 and 21 rigid with the steering column tube or shaft 20.

Embracing the flange of the cup 25 is a hub casing member 30, having its lower end embracing a sleeve ring 28, the lower portion of the casing 30 being turned in below the sleeve whereby when the members 25, 28, and 30 are secured on to the enlargement 21, and abut the shoulder below the head portion 22, and these parts are welded together the wheel hub is securely held against removal without disfigurement and in fact a very strong hub construction is provided.

Referring particularly now to the identification and theft prevention means, preferably on the forward upward spoke of the wheel is located the identification means which as shown in Fig. 1, comprises a plate 10, portions of which are embraced or embossed upwardly forming the numerals 12 comprising an identification number, above and below which are decorative terminal portions which may be formed similarly to the embossed characters, preventing the adding of characters to alter the identification number. This plate is preferably secured by welding although of course may be riveted or otherwise held to the spoke. The outer surface of its embossed characters is preferably level with the surface of the coating material 5, with which the wheel is covered when completed. A brushing or polishing operation may assure the cleaning of the outer surface of the characters and allow them to be very bright and conspicuous, if desired, in contrast to darker color plastic material 5 with which the wheel is coated. Incidentally, it should be noted that the coating of the wheel requires factory equipment including large presses, means for preparing the plastics and otherwise finishing the wheel, thus any attempted alteration or removal of this plastic material on the finished wheel would show defacement and equipment for refinishing would be very expensive and it is not believed it could be successfully altered and repaired by any makeshift equipment to defy detection.

The identification plate, of course, may be placed at different points on the wheel. It may be made to read from left to right around the rim through the coating as at 4 if desired.

This method of embossing a metal plate and securing it to the spider and causing its embossed character or figure to show through the plastic coating may also be used to apply decorative symbols, insignia, trade-marks, or the like.

Figure 4:
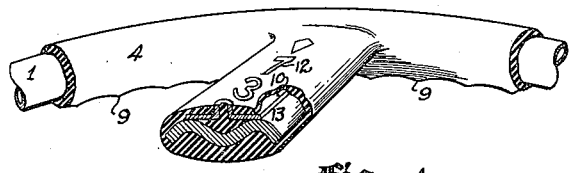
Fig. 4 is a fragmentary sectional perspective through the identification means and one of the spokes of different cross sectional shape.
Figure 5:
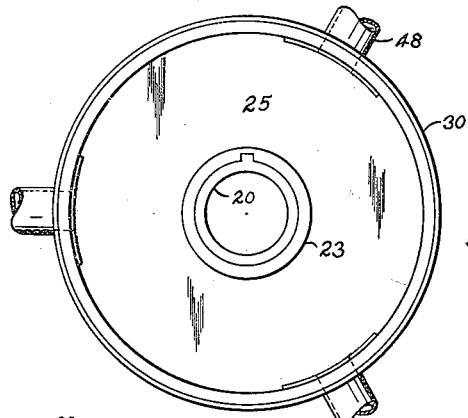
Fig. 5 is a plan view of one form of hub which I may employ.

A form of spider now in wide use includes spokes of ribbed or channel shape, in cross section; such a construction is shown in Fig. 4. Obviously the plate 10 carrying the identification characters 12 could be welded to such a spoke all along its edges, while its characters show through as indicated in Fig. 4

Other parts of the car, for example the instrument board or even exterior surfaces, may be coated by such plastic material, and surrounding such a plate with its identification numerals and may be thickened over the plate if necessary. However, for the reasons above given I prefer to apply it to the steering wheel.

Figures 2, 3:
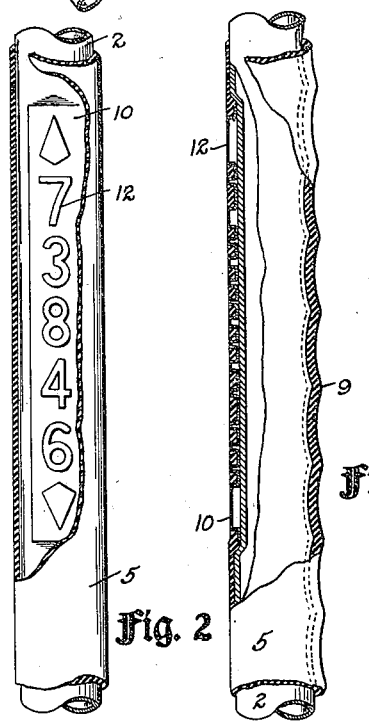
Fig. 2 is an enlarged sectional elevation showing the embossed identification number plate on one of the spokes.
Fig. 3 is a sectional elevation at right angles to the plane of Fig. 2.

In the formation of the rim it is usually desired to provide indentations or finger-hold depressions such as between slightly raised projecting portions, as indicated at 9, in Figs. 3 and 4. The use of a hollow or tubular rim facilitates forming these evenly, by first depressing or shaping the tube and correspondingly shaping the die so that the coating material may take the conformation illustrated, without wasting the material.

Figure 7:
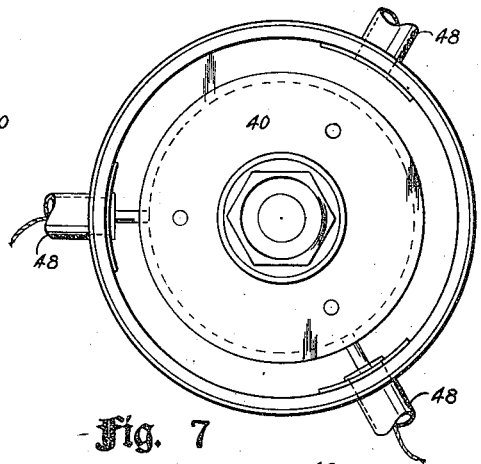
Fig. 7 is a plan view of a modified form of the hub with the cap removed and showing electrical connections.

As above mentioned the tubular spider provides a convenient method of wiring out to button controls, such as shown in the lower two spokes in Fig. 1, one of which may be for lights and the other for the horn, for example. In such case the wires merely extend through the spoke tubes and at the inner end may be connected by the spring pressed brushes, as shown in Fig. 7, to the armature rings 41 and 42, respectively, the spring pressing elements being within the inner portion marked 48 (Fig. 8) of these tubular spokes. In such case these armature rings are carried between insulating members formed in a ring assembly comprising a cupped member 40 and clamped by a nut 49, (Fig. 8) to the upper end of the steering column shaft member.

Figure 6:
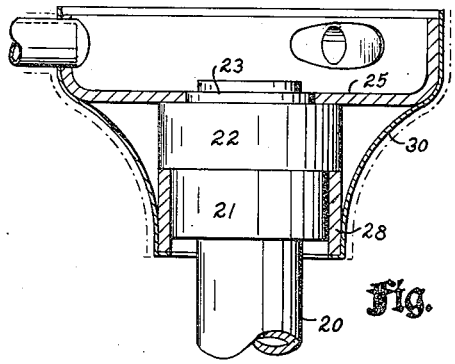
Fig. 6 is a sectional elevation through the hub portion of the wheel shown in Fig. 5.
Figure 8:
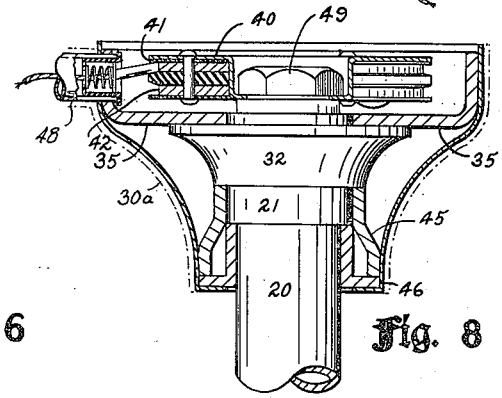
Fig. 8 is the vertical sectional view through the form of hub construction shown in Fig. 7.

The slightly modified hub construction of Fig. 8 includes the ring member 45, corresponding to the ring member 28 of Fig. 6, ring member 45 is flared out and brazed upon the flange of a ring 46 embracing the shaft 20 and abutting the shoulder beneath the cylindrical portion 21. Beneath the flange of the ring 46 is a flanged extension of the hub casing member 30A, while the outer upper portion of this casing member embraces the flange of the cupped member 35 corresponding to member 25 previously described and which is in turn mounted upon the enlarged head 32.

Figure 9:
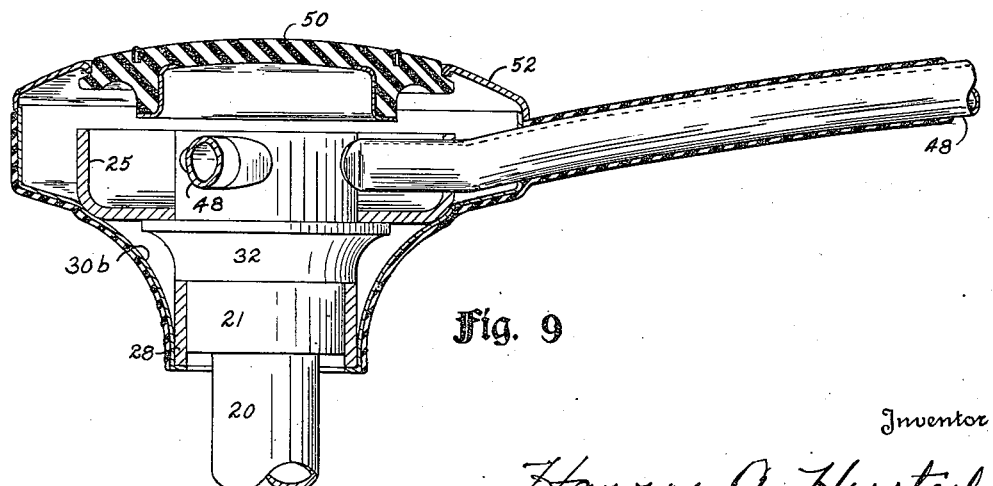
Fig. 9 is slightly enlarged section through another form of hub construction which I may employ showing its connection with the steering column and showing a different arrangement of the spoke connection to the same.

A still further modification of hub construction which I may employ is shown in Fig. 9 and shows the spoke tubes, as extending inwardly through openings in the flange of the member 25 and as having flanged inner end portions welded to the enlarged cylindrical head portion rigid with the tubular steering column shaft 20. Here the hub casing is designated as 30B and is shown as extending outwardly from the cup member 25 and then upwardly to meet a cap member 52 having a suitable opening for receiving the usual horn button 50. Outside of the casing 30B and the spokes the finish coating is applied evenly and in uniform thickness and its regular and unbroken character is obvious from this view.

It is to be understood that not only are the spokes welded to the hub members and to the rim or likewise secured by brazing or similar processes, but the hub elements including the ring 28, cupped member 25, and hub casing 30, are similarly welded or permanently secured together to prevent removal, and from the physical arrangement of these elements it will be seen that these parts would need literally to be destroyed to be dis-assembled or otherwise removed. The same is true of the arrangement of the ring members 45 and 46 of Fig. 8, there being in all cases flanges fitted against opposing shoulders to prevent upward or downward movement of the assembled hub relative to the head portions of the steering column shaft.

In the construction of the rim, straight standard, seamless tubing may be used by bending it into the circle of desired diameter while the spokes may merely be cut from such tubing and the inner ends spread to form the flanges for attachment to the hub members. A simple, strong, light construction through which wires may be passed for the controls for lighting, for horn controls, is thus effected, and by employing in the hub construction a thin, metallic, preferably pressed, drawn or spun metal, hub casing I am enabled to save a large part of the weight of the coating material as compared to the amount heretofore employed.

This casing affords a convenient and cheap method of enlarging the hub as is desired by some automobile manufacturers, without adding any substantial amount to either the metal or the coating. This is particularly illustrated by the arrangement of Fig. 9 where it will be noted the casing extends a substantial distance outside of the flange of the member 25, forming a large hollow hub construction.

From the foregoing description it will be seen that I have provided an identification theft prevention means which may be very cheaply manufactured, easily applied and be extremely difficult of alteration.

It will also be seen from the foregoing description I have provided a tubular wheel spider construction which may be coated with a relatively small amount of comparatively expensive plastics or the like by reason of the uniform contour and ready adaptability to uniform thin coating in molding operation. The use of such plastics effects a great economy in manufacture, as the finishing or curing of the plastics on to the hollow spider requires comparatively a very short period of time, such for example, as a matter of two to five minutes, whereas curing of the composition of hard rubber or the like particularly when applied with much thicker portions may require as much as an hour of curing time in the molds, thus necessarily greatly adding to the expense of manufacture. Various changes and modifications may be made in the constructions described and illustrated without departing from the spirit of my invention.

Having thus described my invention, what I claim is:

1. The combination with a steering wheel non-removably fixed to its steering column and having spokes and a rim supported thereby, of metallic frame elements in the spokes and rim, and a coating thereon, an identification character permanently secured to one of the metallic elements and projecting outwardly through the coating.

2. The combination with a steering wheel having spokes and a rim supported thereby, comprised of metallic elements and a permanent molded coating thereon, identification characters rigid with one of the metallic elements and projecting outwardly through the coating and visible at the surface thereof.

3. An automobile steering wheel having a metallic spider and a coating thereon, a metallic character bearing element permanently secured to the upper side of the spider, and said coating material for the spider covering the metallic element yet exposing the character, whereby identification means may be provided legible from the exterior of a closed body type automobile when its windows are closed, and which may not be altered or removed without destroying or disfiguring the coating on the wheel.

4. A steering wheel comprising a spider and having its surface contour formed of a plastic coating thereon, an automobile identification means consisting of a base plate welded to the spider and having raised letters thereon extending outwardly through the coating to present the characters, whereby an attempted alteration will mutilate the coating.

5. An automobile part comprising a metallic frame member and a plastic coating thereon, an automobile identification means consisting of a base plate welded to said member and having raised letters thereon extending outwardly through the coating to legibly present the characters, and whereby attempted alteration will deface the coating.

6. The combination with an automobile steering wheel having a plastic coated spider, of an embossed thin metalic strip providing idenification numerals or like characters secured to the spider of the wheel, the embossing projecting to the surface of the coating of the finished wheel and whereby attempted alteration will destroy either the coating or leave open lettering.

7. The combination with an automobile steering wheel having a metallic plastic coated spider of a metallic strip welded to the spider and provided with identification numerals or characters embossed thereon and projecting to the height of the coating of the finished wheel and whereby attempted alteration will be apparent from the resulting mutilation of the coating.

HARRY A. HUSTED.